(12) United States Patent
Kawabata

(10) Patent No.: US 12,556,672 B2
(45) Date of Patent: Feb. 17, 2026

(54) VIDEO PROCESSING APPARATUS FOR DESIGNATING AN OBJECT ON A PREDETERMINED VIDEO AND CONTROL METHOD OF THE SAME, AND STORAGE MEDIUM

(71) Applicant: CANON KABUSHIKI KAISHA, Tokyo (JP)

(72) Inventor: Kohsuke Kawabata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/165,990

(22) Filed: Feb. 8, 2023

(65) Prior Publication Data
US 2023/0269356 A1    Aug. 24, 2023

(30) Foreign Application Priority Data

Feb. 22, 2022  (JP) ................................ 2022-025603

(51) Int. Cl.
*H04N 13/282*   (2018.01)
*H04N 13/106*   (2018.01)
*H04N 13/117*   (2018.01)

(52) U.S. Cl.
CPC ......... *H04N 13/158* (2018.05); *H04N 13/117* (2018.05); *H04N 13/282* (2018.05)

(58) Field of Classification Search
CPC .................................................. H04N 13/117
See application file for complete search history.

(56) References Cited

U.S. PATENT DOCUMENTS

| 11,526,267 | B2 * | 12/2022 | Hanamoto | .......... G06F 3/04847 |
| 2018/0343442 | A1 * | 11/2018 | Yoshikawa | .......... H04N 21/438 |
| 2019/0182470 | A1 * | 6/2019 | Mizuno | ................. G06T 15/205 |

(Continued)

FOREIGN PATENT DOCUMENTS

| JP | 2016-010145 A | 1/2016 |
| JP | 2016-213808 A | 12/2016 |
| JP | 2019-106617 A | 6/2019 |

(Continued)

OTHER PUBLICATIONS

Notice of Reasons for Refusal issued by the Japanese Patent Office on Dec. 15, 2025 in corresponding JP Patent Application No. 2022-025603, with English translation.

*Primary Examiner* — Jayanti K Patel
*Assistant Examiner* — Christopher Kingsbury Glover
(74) *Attorney, Agent, or Firm* — Carter, DeLuca & Farrell LLP

(57) ABSTRACT

A video processing apparatus accepts, from a user, designation of an object on a predetermined video captured by a first real image capturing apparatus, specifies, from a plurality of second real image capturing apparatuses, an image capturing apparatus that captured a video including the designated object in an image capturing range based on three dimensional shape information corresponding to the designated object. The designated object exists in an image capturing area captured by the plurality of second real image capturing apparatuses. The video processing apparatus outputs display information including presentation of the specified image capturing apparatus.

13 Claims, 17 Drawing Sheets

(56) References Cited

U.S. PATENT DOCUMENTS

2021/0027496 A1\* 1/2021 Koyama .................. G06T 7/73
2023/0419596 A1\* 12/2023 Miyata .................. H04N 23/60

FOREIGN PATENT DOCUMENTS

| JP | 2021-015440 A | 2/2021 |
| WO | 2021/220892 A1 | 11/2021 |
| WO | 2022/024593 A1 | 2/2022 |

\* cited by examiner

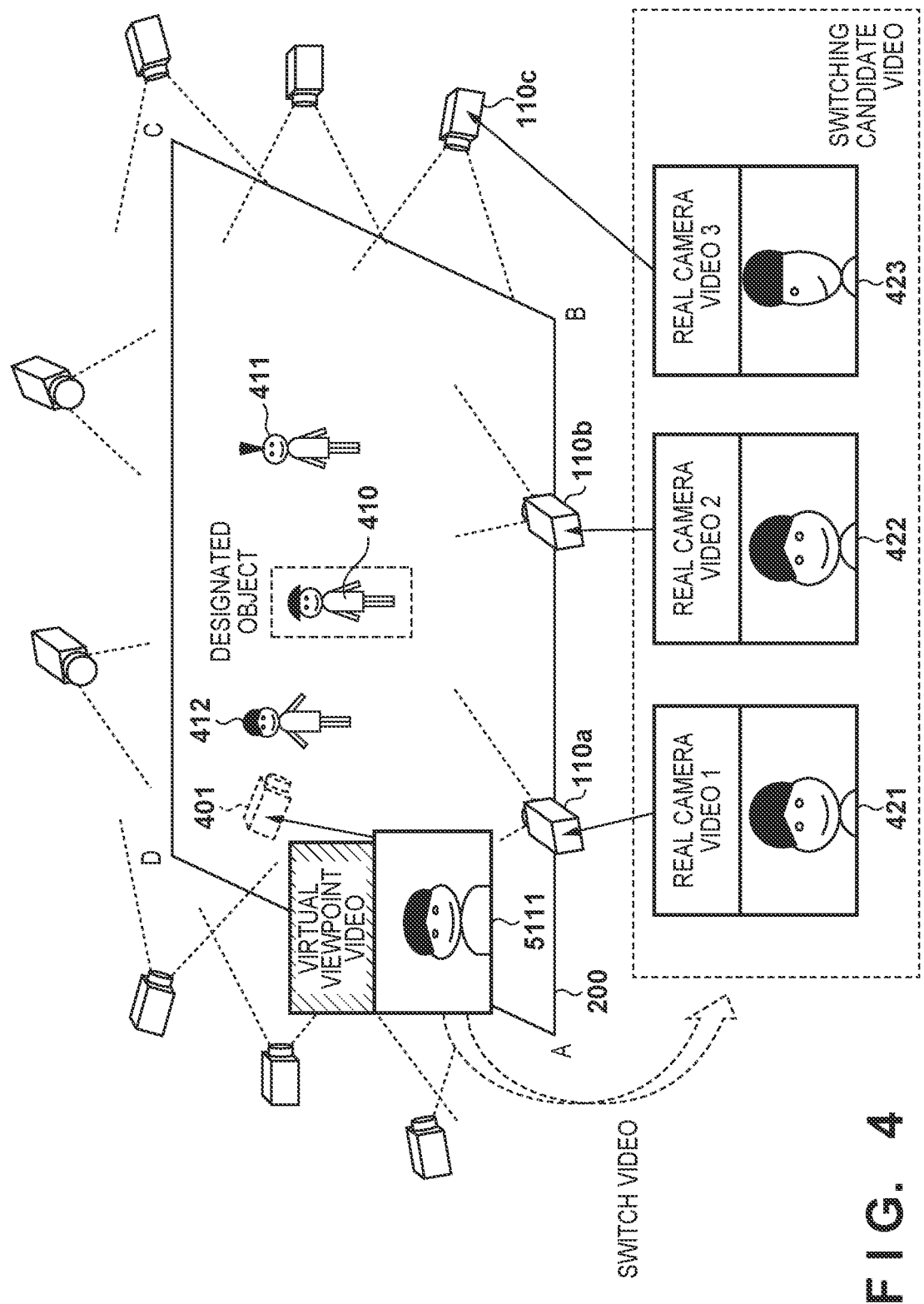
F I G. 4

FIG. 11

| NUMBER OF IMAGE CAPTURING APPARATUS TO BE USED | TIME 11:30:31 | | | | TIME 11:30:32 | | | |
|---|---|---|---|---|---|---|---|---|
| | NUMBER OF BOUNDING BOX | | | | NUMBER OF BOUNDING BOX | | | |
| | B2000 | B2001 | B2002 | ... | B2000 | B2001 | B2002 | ... |
| 1 | 1 | 15 | 3 | | 1 | 15 | 3 | |
| 2 | 2 | 16 | 4 | | 2 | 16 | 4 | |
| 3 | 3 | 25 | 5 | | | 25 | 6 | |
| 4 | 15 | 27 | 6 | | 16 | 27 | 7 | |
| 5 | 16 | | 7 | | 17 | 28 | | |
| 6 | | | | | 18 | 29 | | |

| | | TIME 11:30:31 | | | | TIME 11:30:32 | | | |
|---|---|---|---|---|---|---|---|---|---|
| | | NUMBER OF BOUNDING BOX | | | | NUMBER OF BOUNDING BOX | | | |
| | | B2000 | B2001 | B2002 | ... | B2000 | B2001 | B2002 | ... |
| NUMBER OF IMAGE CAPTURING APPARATUS TO BE USED | | REAL CAMERA 1 | REAL CAMERA 15 | REAL CAMERA 3 | | REAL CAMERA 1 | REAL CAMERA 15 | REAL CAMERA 3 | |
| | | REAL CAMERA 2 | REAL CAMERA 16 | REAL CAMERA 4 | | REAL CAMERA 2 | REAL CAMERA 16 | REAL CAMERA 4 | |
| | | REAL CAMERA 3 | REAL CAMERA 25 | REAL CAMERA 5 | | REAL CAMERA 16 | REAL CAMERA 25 | REAL CAMERA 6 | |
| | | REAL CAMERA 15 | REAL CAMERA 27 | REAL CAMERA 6 | | REAL CAMERA 17 | REAL CAMERA 27 | REAL CAMERA 7 | |
| | | REAL CAMERA 16 | VIRTUAL VIEWPOINT 2 | REAL CAMERA 7 | | REAL CAMERA 18 | REAL CAMERA 28 | VIRTUAL VIEWPOINT 1 | |
| | | VIRTUAL VIEWPOINT 1 | | VIRTUAL VIEWPOINT 1 | | VIRTUAL VIEWPOINT 1 | REAL CAMERA 29 | | |
| | | | | | | | VIRTUAL VIEWPOINT 2 | | |

1600

VIDEO PROCESSING APPARATUS FOR DESIGNATING AN OBJECT ON A PREDETERMINED VIDEO AND CONTROL METHOD OF THE SAME, AND STORAGE MEDIUM

BACKGROUND

Field

The present disclosure relates to a video processing apparatus, a control method of the same, and a storage medium.

Description of the Related Art

In recent years, a virtual viewpoint video generation technology of synthesizing videos captured at an arbitrary viewpoint (hereinafter, referred to as a virtual viewpoint video) from multi-viewpoint images captured synchronously by a plurality of cameras installed at different positions has been realized. For example, by image capturing a sport such as soccer or basketball using the virtual viewpoint video generation technology, it becomes possible to view a video as if it were being captured from within a field during a game, in which image capturing by a cameraman was not possible. Thus, according to the virtual viewpoint video generation technology, generation of a video system that gives a viewer a higher sense of realism and generation of a video with a higher degree of freedom become possible.

A system for generating a virtual viewpoint video has a configuration in which a plurality of cameras are installed. A large number of cameras may be installed depending on the size of the image capturing range and the required image quality. Therefore, in a system that generates a virtual viewpoint video, it is difficult for a user to confirm what video is output by each camera. For example, in a case where a virtual viewpoint video is switched to a video of a camera that is actually image capturing (hereinafter referred to as a real camera), the user needs to check the video from the real camera. However, if the number of cameras is large as described above, it is difficult for the user to confirm the intended video of the real camera.

Japanese Patent Laid-Open No. 2019-106617 discloses a technique of specifying a real camera used for virtual viewpoint video generation from the positions of a plurality of real cameras used for virtual viewpoint video generation and the position of a virtual viewpoint, and displaying the video of the specified real camera.

However, in the technique disclosed in Japanese Patent Laid-Open No. 2019-106617, only the video of the real camera used for generating the virtual viewpoint video can be displayed. For example, in a situation where a plurality of performers are performing in a studio or the like, when it is desirable to switch from a virtual viewpoint video to a real camera video showing a specific performer, the operator needs to check a video showing the specific performer from the videos of a plurality of real cameras and perform switching. In this case, it is necessary to switch to the video of the real camera showing the specific object regardless of the generation of the virtual viewpoint video, but the technology of Japanese Patent Laid-Open No. 2019-106617 is not intended to support such switching to the real camera.

SUMMARY

A video processing apparatus according to an aspect of the present disclosure has the following configuration.

According to one aspect of the present disclosure, there is provided a video processing apparatus comprising: one or more memories storing instructions; and one or more processors for executing the instructions to: specify, from a plurality of image capturing apparatuses, an image capturing apparatus including an object designated by a user in an image capturing range based on three dimensional shape information corresponding to the object, the object existing in an image capturing area captured by the plurality of image capturing apparatuses; and output display information including presentation of the specified image capturing apparatus.

Further features of the present disclosure will become apparent from the following description of exemplary embodiments with reference to the attached drawings.

BRIEF DESCRIPTION OF THE DRAWINGS

FIG. 4 is a diagram for explaining functions of the video processing apparatus according to the first embodiment.

FIG. 11 is a diagram showing a list of a bounding box and an image capturing apparatus.

FIG. 16 is a diagram showing a list of a bounding box, and an image capturing apparatus and a virtual viewpoint.

DESCRIPTION OF THE EMBODIMENTS

Hereinafter, embodiments are described in detail by referring to the accompanying drawings. Note that the following embodiments do not limit the present disclosure. Although a plurality of features are described in the embodiments, not all of the plurality of features are essential to the present disclosure, and the plurality of features may be arbitrarily combined. Further, in the accompanying drawings, identical or similar components are denoted by identical reference signs, and redundant description is omitted.

First Embodiment

Figure 1:
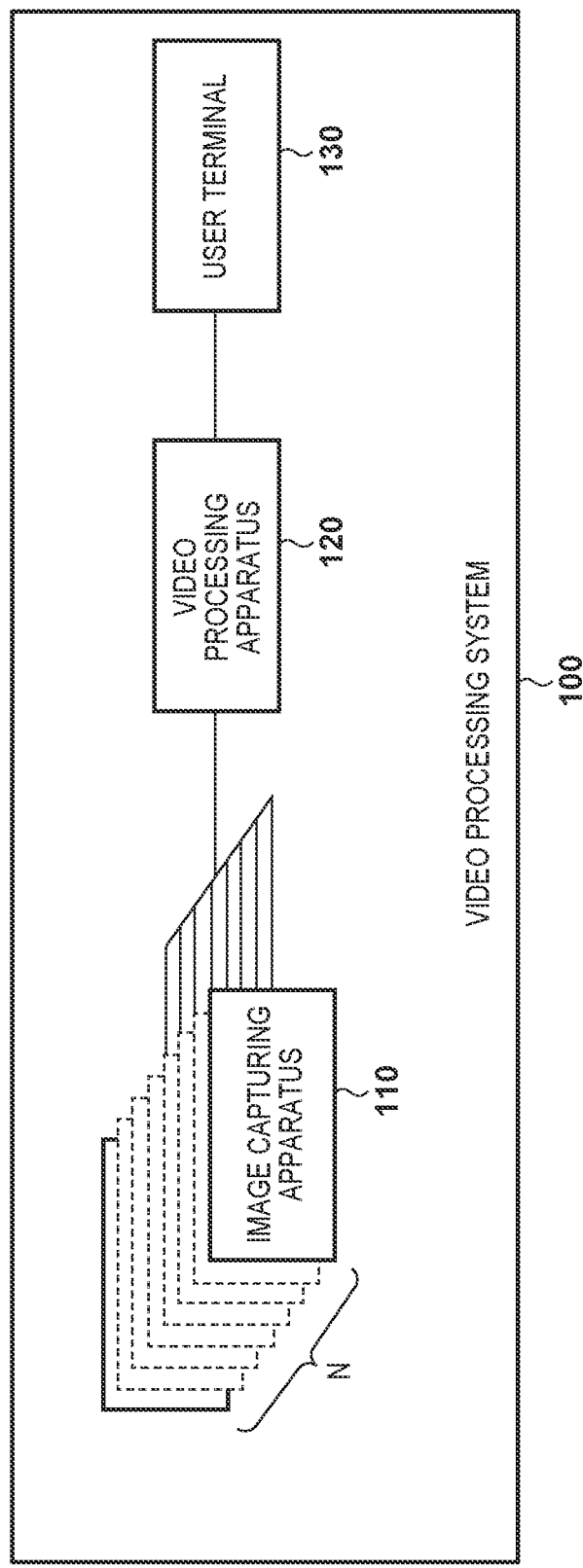
FIG. 1 is a block diagram illustrating a configuration example of a video processing system according to a first embodiment.
Figure 2:
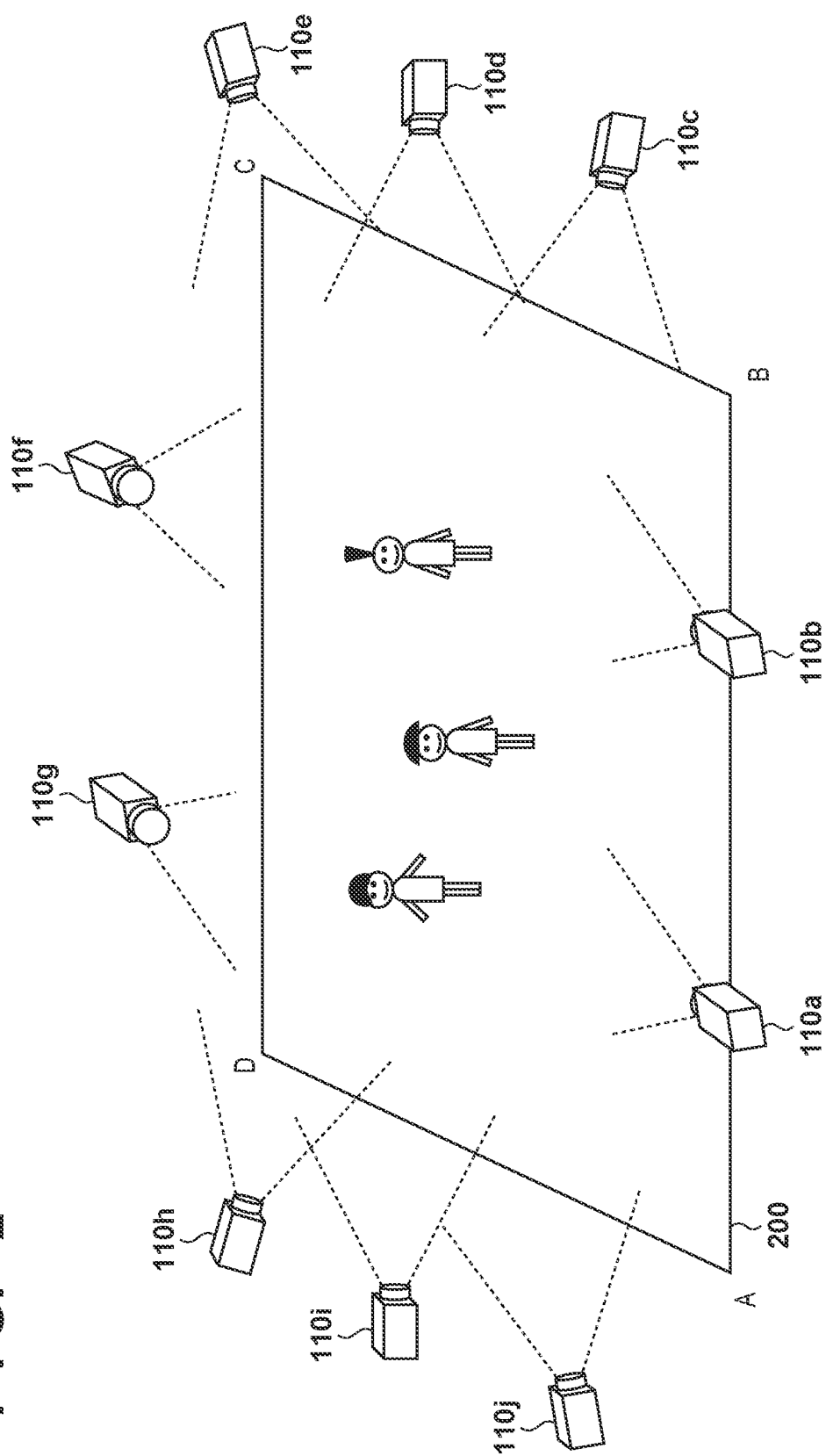
FIG. 2 is a diagram illustrating an arrangement example of an image capturing apparatus according to the first embodiment.

FIG. 1 is a block diagram illustrating a configuration example of a video processing system according to a first embodiment. A video processing system 100 includes N image capturing apparatuses 110 as real cameras, a video processing apparatus 120, and a user terminal 130. The image capturing apparatus 110 includes a lens, an image capturing sensor such as a CCD or a CMOS, a video processing circuit, and the like (not illustrated), and is configured to convert optical information from an object to be captured into an electric signal, and transmits the electric signal to the video processing apparatus 120 as image information in a predetermined format such as RAW. FIG. 2 shows an arrangement example of the N image capturing apparatuses 110 in the video processing system 100. The image capturing apparatuses 110a to 110j are disposed so as to surround the image capturing area 200, and are configured to capture an image of an object in the image capturing area 200, and provide a multi-viewpoint image for generating a virtual viewpoint video. Note that the number and arrangement positions of the image capturing apparatuses 110 can be appropriately set in accordance with an image capturing area, an image capturing target, required video quality, and the like.

Figure 3:
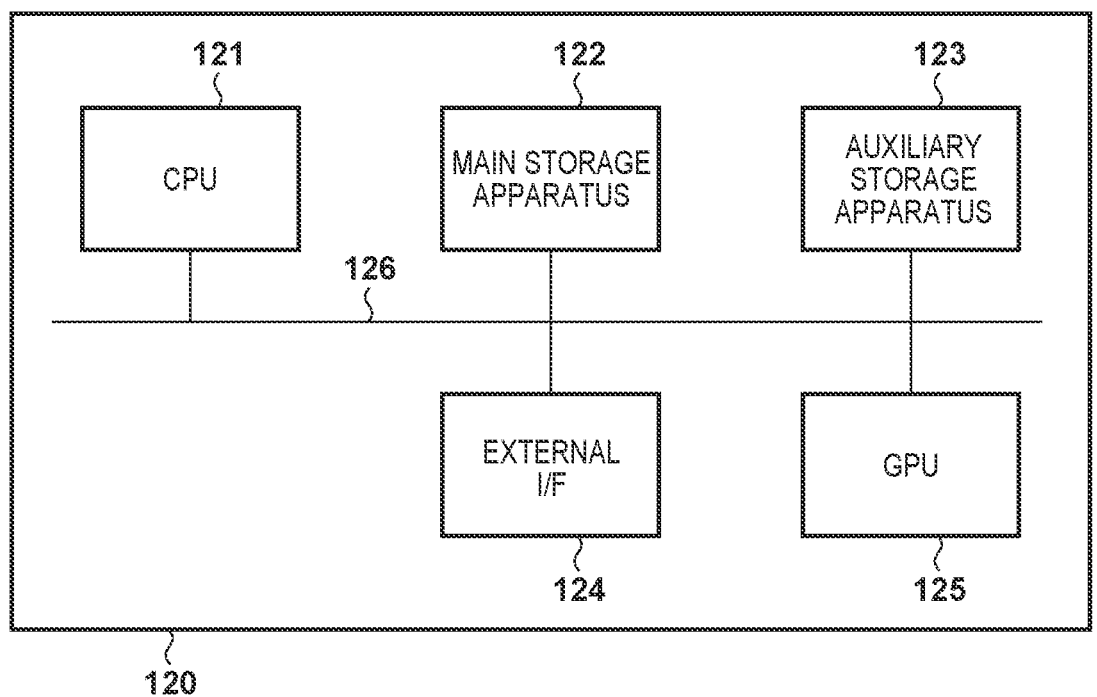
FIG. 3 is a block diagram illustrating a hardware configuration example of a video processing apparatus according to the first embodiment.

The video processing apparatus 120 generates and outputs a virtual viewpoint video by aggregating the videos from the image capturing apparatus 110 and performing appropriate processing thereon. The video processing apparatus 120 can also select a video captured by the image capturing apparatus 110, convert the video into data in an appropriate format, and output the data. FIG. 3 illustrates a hardware configuration example of the video processing apparatus 120. The video processing apparatus 120 includes a CPU 121, a main storage apparatus 122, an auxiliary storage apparatus 123, an external I/F 124, and a GPU 125, which are communicably connected to each other via an internal bus 126.

The CPU 121 is a central processing unit and controls the video processing apparatus 120 such as various calculations, video processing, and data input/output. The main storage apparatus 122 functions as a work area of the CPU 121 and a temporary storage area for data. The main storage apparatus 122 is implemented using, for example, a storage medium such as a dynamic random access memory (DRAM), a static random access memory (SRAM), or the like. The auxiliary storage apparatus 123 stores information such as various programs, various setting information, various image data, camera parameters, three dimensional shape information, two dimensional map, and the like. The auxiliary storage apparatus 123 can be implemented using, for example, a non-volatile memory such as various types of read only memories (ROM) and flash memories, or a storage medium such as a hard disk drive (HDD), a solid state drive (SSD), or a tape medium. Note that the auxiliary storage apparatus 123 may be configured by a combination of a plurality of storage media in order to increase capacity and speed, and may be, for example, a device in which a plurality of storage media are logically integrated into one by RAID.

The external I/F 124 includes, for example, a communication interface used for communication with an external device such as a camera, a PC, or a device. Furthermore, the external I/F 124 includes a general-purpose input/output interface for connecting to an external device that receives various operations from a user, such as a joystick, a keyboard, or a mouse, or connecting to an external storage to perform file input/output. The external I/F 124 includes, for example, an interface having a connection terminal of a physical cable such as InfiniBand, Ethernet, or USB, or an interface using radio such as wireless LAN or Bluetooth. Note that USB is an abbreviation for Universal Serial Bus. In the video processing system 100, video information outputted from the N image capturing apparatuses 110 is aggregated by a switching hub (not illustrated) or the like and input to the external I/F 124.

The GPU 125 is a calculation device for executing a video processing calculation at high speed, and has a function of generating shape data and color information necessary for a virtual viewpoint video in addition to a process of rendering an image from a virtual viewpoint. The GPU 125 may separately include a main storage apparatus different from the main storage apparatus 122. In addition, the GPU 125 may perform some or all of various calculations performed by the CPU 121 other than those described above. The internal bus 126 includes a bus such as PCI Express, and each unit of the hardware block can perform bidirectional communication with each other. Furthermore, any internal bus 126 may be used as long as each unit of the hardware block can communicate bidirectionally.

The user terminal 130 includes a display device such as a liquid crystal monitor (not illustrated) and an input device such as a keyboard, a mouse, and a joystick, and is connected to the video processing apparatus 120 by way of the external I/F 124. The user terminal 130 displays the video outputted from video processing apparatus 120 on the display device, converts the input from the input device by the user into an appropriate signal, and outputs the signal to the video processing apparatus 120. The hardware configuration of the user terminal 130 can be similar to, for example, that of the video processing apparatus 120 (FIG. 3). In addition, the video processing apparatus 120 may have the function of the user terminal 130. For example, the video processing apparatus 120 and the user terminal 130 may be realized by one apparatus.

Although the configuration of the video processing system of the present embodiment has been described above with reference to FIGS. 2 and 3, this configuration is merely an example, and can be appropriately changed and configured according to an image capturing target and a function.

Next, with reference to FIGS. 4 to 11, a method for specifying and displaying a video of an image capturing apparatus including a specific object among videos from a plurality of image capturing apparatuses according to the first embodiment is described.

First, an outline of functions realized in the present embodiment is described with reference to FIG. 4. In the present embodiment, in a situation where it is desirable to switch the distribution video from a state in which the virtual viewpoint video is distributed to the video of the image capturing apparatus showing the specific object, the video of the image capturing apparatus image-capturing the specific object is displayed as the candidate video, thereby realizing the function of assisting the operator at the time of video switching.

In FIG. 4, objects 410 to 412 are present in an image capturing area 200. For example, assume that it is desirable to switch the distribution video from the state in which the virtual viewpoint video 402 is captured from the virtual viewpoint 401 and distributed to the video of the image capturing apparatus showing the object 410. When the video switching operator selects the object 410 as an object to be gazed (hereinafter referred to as a gaze object), the video image of the image capturing apparatus capturing the object 410 is extracted from the videos of the plurality of image capturing apparatuses. Here, it is assumed that the image capturing apparatus 110a, the image capturing apparatus 110b, and the image capturing apparatus 110c are extracted from the N image capturing apparatuses 110. In this case, a video 421 captured by the image capturing apparatus 110a, a video 422 captured by the image capturing apparatus 110b, and a video 423 captured by the image capturing apparatus 110c are displayed as candidate videos. As described above, in the present embodiment, candidate videos are extracted from a large number of videos and displayed, an intended video can be selected from a fewer number of videos. Therefore, as compared with an operation of selecting an intended video from a large number of videos outputted from a plurality of installed image capturing apparatuses, the burden of the operator to confirm the video can be greatly reduced.

Figure 5:
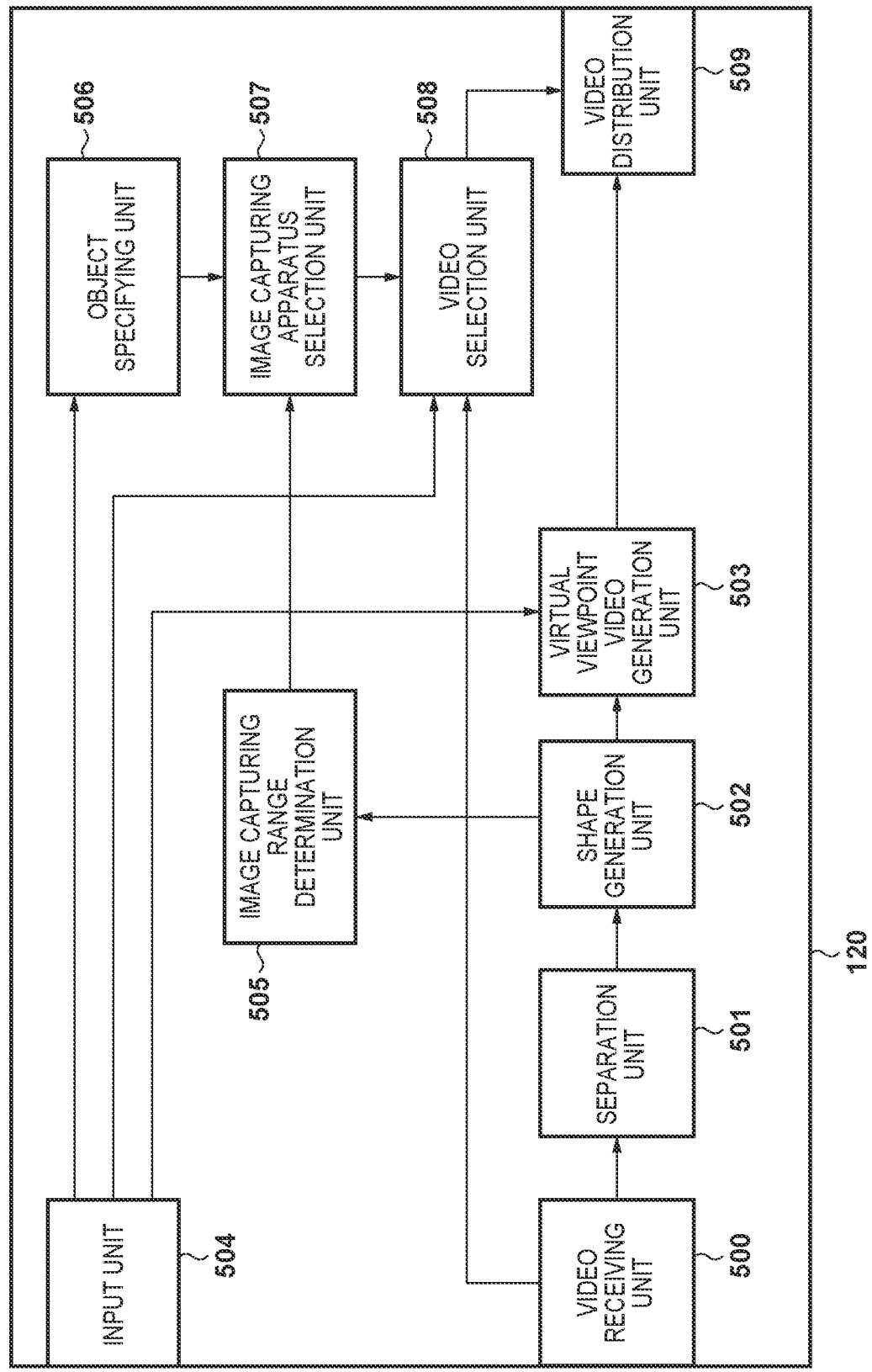
FIG. 5 is a block diagram illustrating a functional configuration example of the video processing apparatus according to the first embodiment.

Next, a functional configuration of the video processing apparatus 120 according to the first embodiment is described. FIG. 5 is a block diagram illustrating a functional configuration example of the video processing apparatus 120. Each functional block illustrated in FIG. 5 is realized, for example, by causing the CPU 121 (FIG. 3) to load and execute a computer program stored in the auxiliary storage apparatus 123 in the main storage apparatus 122. Some or all of the functional blocks may be realized by dedicated hardware, or may be realized by cooperation of a computer and hardware.

The video receiving unit 500 receives a video from the image capturing apparatus 110 via a LAN cable or the like, converts the video into an appropriate data format, and sends the data to the separation unit 501 and the video selection unit 508. The separation unit 501 cuts out the region of the object at an appropriate size from the video input from video receiving unit 500, and separates the region to generate the foreground image. In the present embodiment, the separation unit 501 separates objects using, for example, a background subtraction method to be described later, and generates the foreground image. The separation unit 501 sends the generated foreground image to the shape generation unit 502.

In the present embodiment, an object refers to a dynamic object (moving body) that moves (whose absolute position and shape can change) when images are captured in the same direction in time series. For example, in a sports competition, a person such as a player or a referee in a field in which a competition performed, a ball if the competition is a ball game, or the like corresponds to an object. In addition, the background subtraction method is a method of using an arbitrary image obtained from the image capturing apparatus as a reference image, comparing the reference image with one or a plurality of images temporally close to the reference image, and extracting a region with a change as a foreground image. In the background subtraction method, for example, pixel values are compared for each pixel in an image, and a collection of pixels having a small difference (pixels without movement) is extracted as a background image. Then, a region with a change is extracted by subtracting the region of the generated background image from the reference image, and a foreground image is generated.

Figure 6:
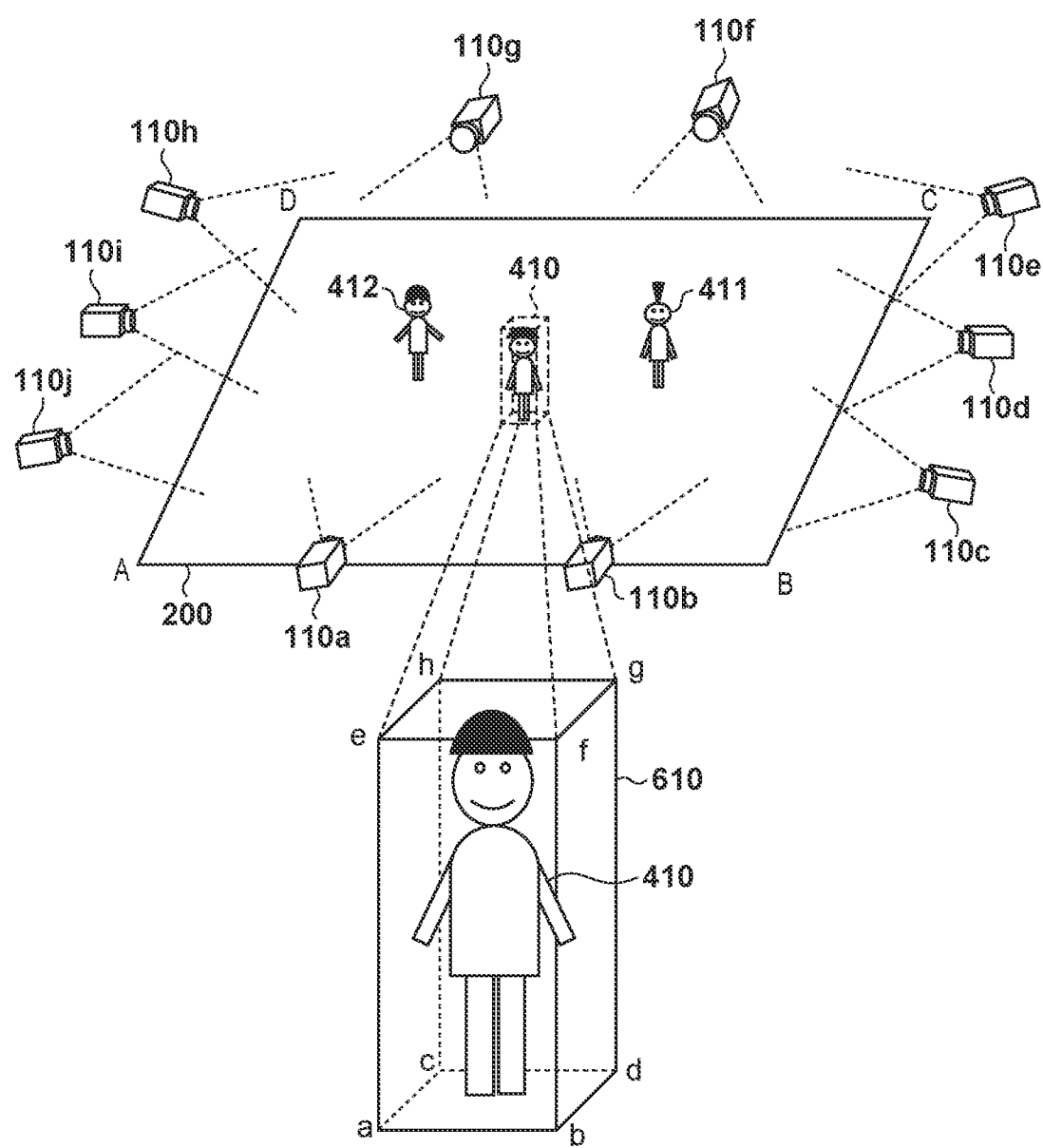
FIG. 6 is a diagram for explaining a bounding box set for an object.

The shape generation unit 502 generates three dimensional shape information by a three dimensional shape restoration method such as a visual-volume intersection method or Multi-View-Stereo (MVS) on the basis of the foreground image input from the separation unit 501. Note that the coordinate information of the arrangement positions and the field angle information of the N image capturing apparatuses 110 required to restore the three dimensional shape of the object are, for example, stored in advance in the auxiliary storage apparatus 123. Furthermore, the shape generation unit 502 defines a rectangular parallelepiped that surrounds (e.g., circumscribes a three dimensional shape) the three dimensional shape represented by the generated three dimensional shape information. Hereinafter, this rectangular parallelepiped is referred to as a bounding box. FIG. 6 shows the relationship between the object and the bounding box. In the example of FIG. 6, a bounding box 610 for the object 410 in the image capturing area 200 is defined. The bounding box 610 is defined as a rectangular parallelepiped having point a, point b, point c, point d, point e, point f, point g, and point h as vertices. Note that, regarding the three dimensional shape or the bounding box 610 of the object, information on the position in the three dimensional space is also acquired.

The virtual viewpoint video generation unit 503 receives the information on the three dimensional shape generated by the shape generation unit 502 and the information on the position and direction of the virtual viewpoint input from the user terminal 130 via the input unit 504 described later. The virtual viewpoint video generation unit 503 calculates how the three dimensional shape looks from the position of the virtual viewpoint based on the received information, generates a virtual viewpoint video by performing coloring using the image of the corresponding image capturing apparatus, and outputs the virtual viewpoint video to the video distribution unit 509.

The input unit 504 receives a signal input from the user terminal 130 via the external I/F 124, and transmits the signal to the virtual viewpoint video generation unit 503. Furthermore, the input unit 504 inputs coordinates in the display video designated by the user to specify the gaze object. Furthermore, the input unit 504 inputs viewpoint information indicating the position and direction of the virtual viewpoint for generating the virtual viewpoint video. The viewpoint information includes, for example, a parameter representing the three dimensional position of the virtual viewpoint and a parameter representing the direction of the virtual viewpoint in the pan, tilt, and roll directions. Note that the content of the viewpoint information is not limited to the above, and may be information indicating the position and direction of the virtual viewpoint.

Figure 7:
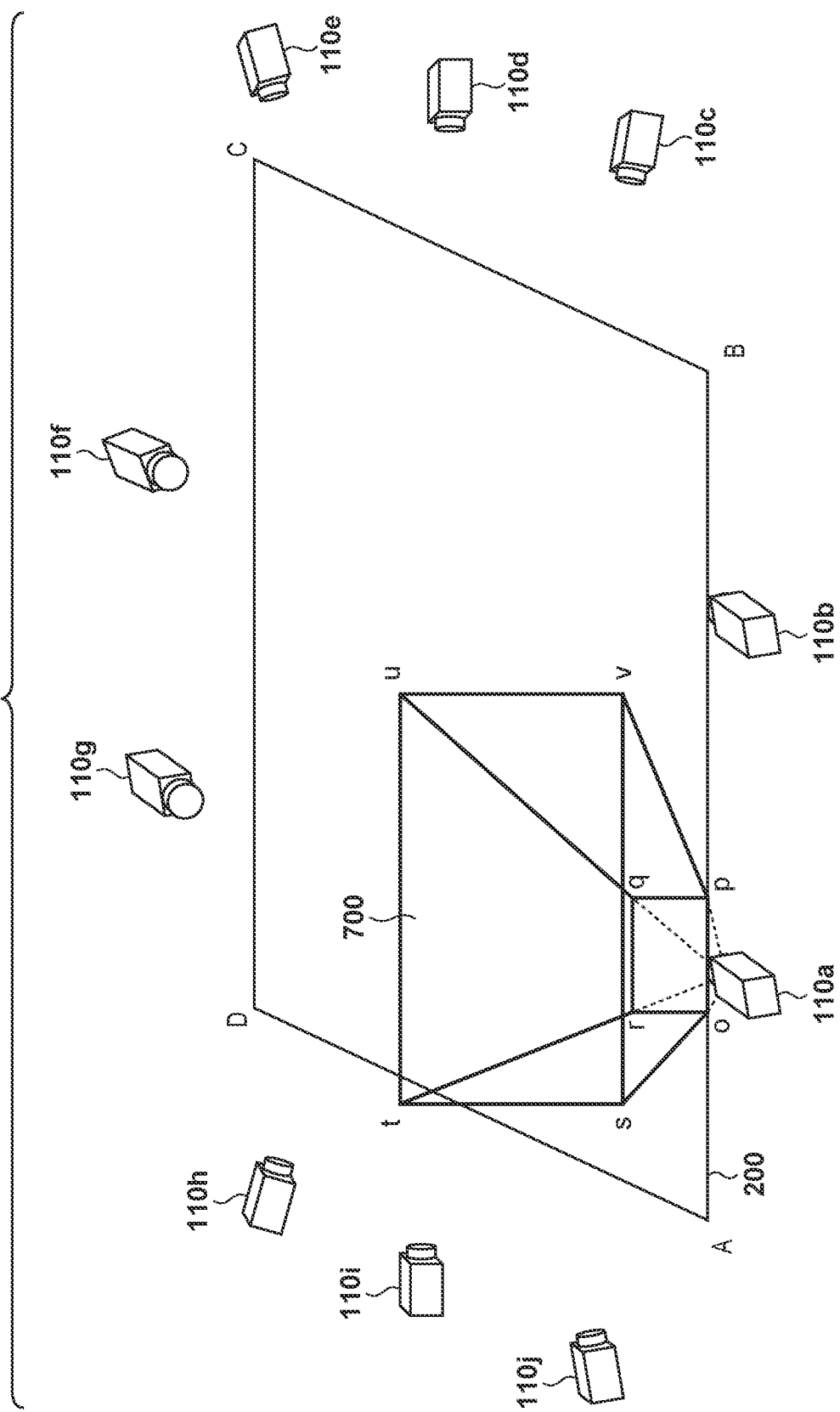
FIG. 7 is a schematic diagram illustrating an image capturing range of the image capturing apparatus.
Figure 8:
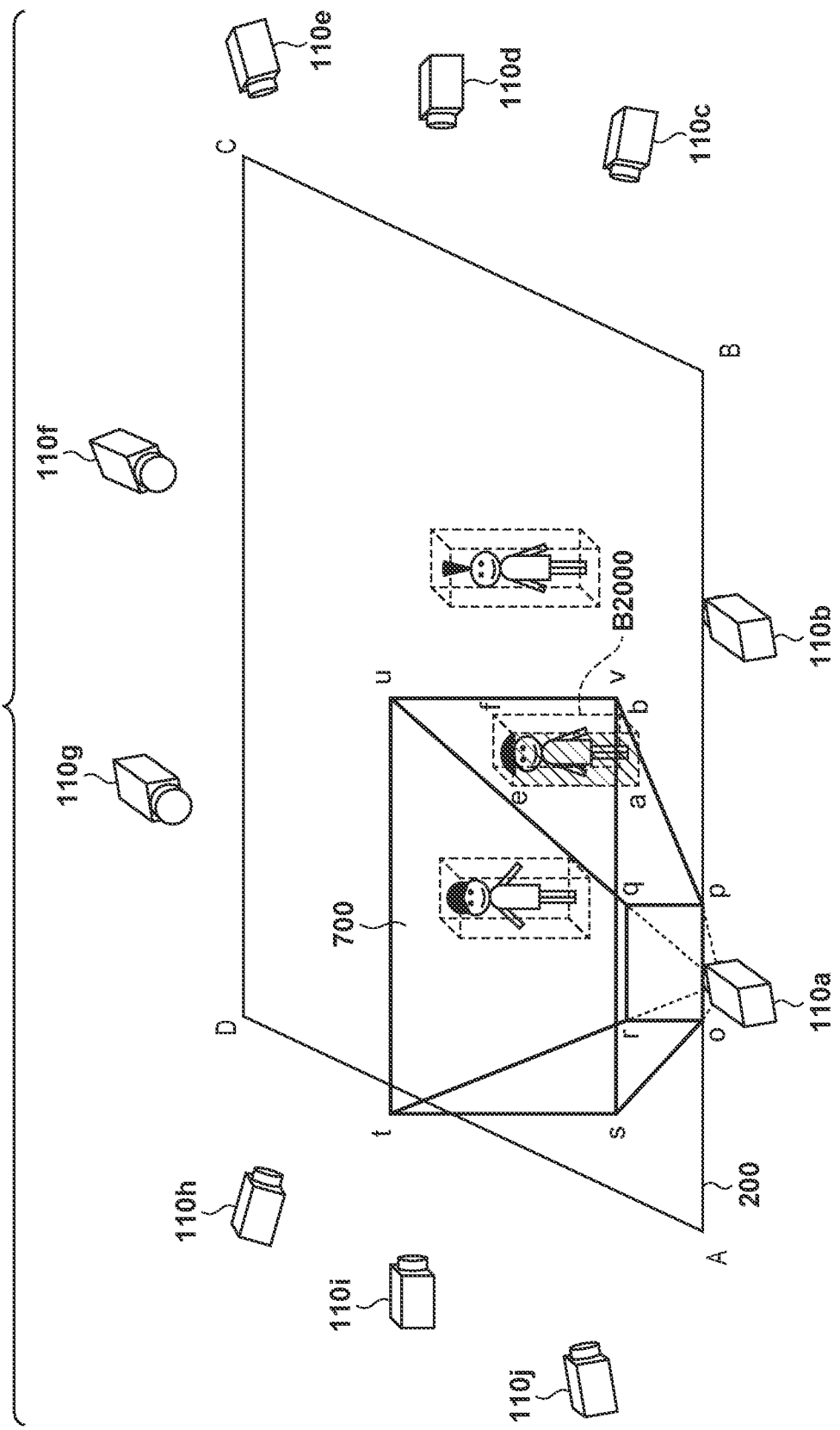
FIG. 8 is a diagram illustrating a determination method of an image capturing apparatus that captures an image of an object.

The image capturing range determination unit 505 determines a physical object present inside the image capturing range 700 of the image capturing apparatus 110a as illustrated in FIG. 7 as a physical object captured by the image capturing apparatus 110a. An image capturing range 700 of the image capturing apparatus 110a is defined by a stereoscopic figure (e.g., a quadrangular pyramid) having point o, point p, point q, point r, point s, point t, point u, and point v as vertices. The physical object present inside the image capturing range 700 is determined as being captured by the image capturing apparatus 110a. The image capturing range 700 is a range in which an image can be captured calculated on the basis of image capturing parameters such as a position, an orientation, a focal length, and an F value of the image capturing apparatus 110a, and three dimensional coordinate information representing the image capturing range 700 is stored in advance, for example, in the auxiliary storage apparatus 123. Such an image capturing range is set in advance for each of the plurality of image capturing apparatuses 110 in accordance with each image capturing parameter and is stored in the auxiliary storage apparatus 123.

Furthermore, the image capturing range determination unit 505 determines whether or not each of the plurality of image capturing apparatuses is capturing the bounding box acquired by the shape generation unit 502, and extracts the image capturing apparatus capturing the bounding box. This determination method is described with reference to FIG. 8. Here, the image capturing apparatus 110 to be determined is assumed to be an image capturing apparatus that is capturing each surface other than the bottom surface of the bounding box. Note that, as described above, the position of the three dimensional space of the bounding box (three dimensional shape of the object) is acquired by the shape generation unit 502. In a case where a part of or the entire surface abfe of the bounding box is included inside the image capturing range 700 as in the image capturing apparatus 110a in FIG. 8, the image capturing range determination unit 505 determines that the image capturing apparatus 110a is the image capturing apparatus image-capturing the bounding box 610. The image capturing range determination unit 505 performs this determination on each surface to be determined of the bounding box 610, and specifies an image capturing apparatus image-capturing the bounding box 610. The image capturing range determination unit 505 performs the above process on each of the bounding boxes existing in the image capturing area 200, and obtains the bounding box existing in the image capturing area 200 at a certain time and a determination result of the image capturing apparatus that is capturing the relevant bounding box. In accordance with the determination result, the image capturing range determination unit 505 generates a list (described later with reference to FIG. 11) associating the bounding box at each time with the image capturing apparatus capturing the relevant bounding box.

An object specifying unit 506 specifies a bounding box corresponding to the gaze object designated by the user operation, and notifies an image capturing apparatus selection unit 507 of the bounding box. The gaze object is designated, for example, by designating a position of an object that the user wants to closely observe in the video display for selecting the object. The coordinates (coordinates for specifying the gaze object) specified by the user on the video are provided from the input unit 504 to the object specifying unit 506. The object specifying unit 506 specifies the bounding box of the gaze object from the coordinates.

Figure 9:
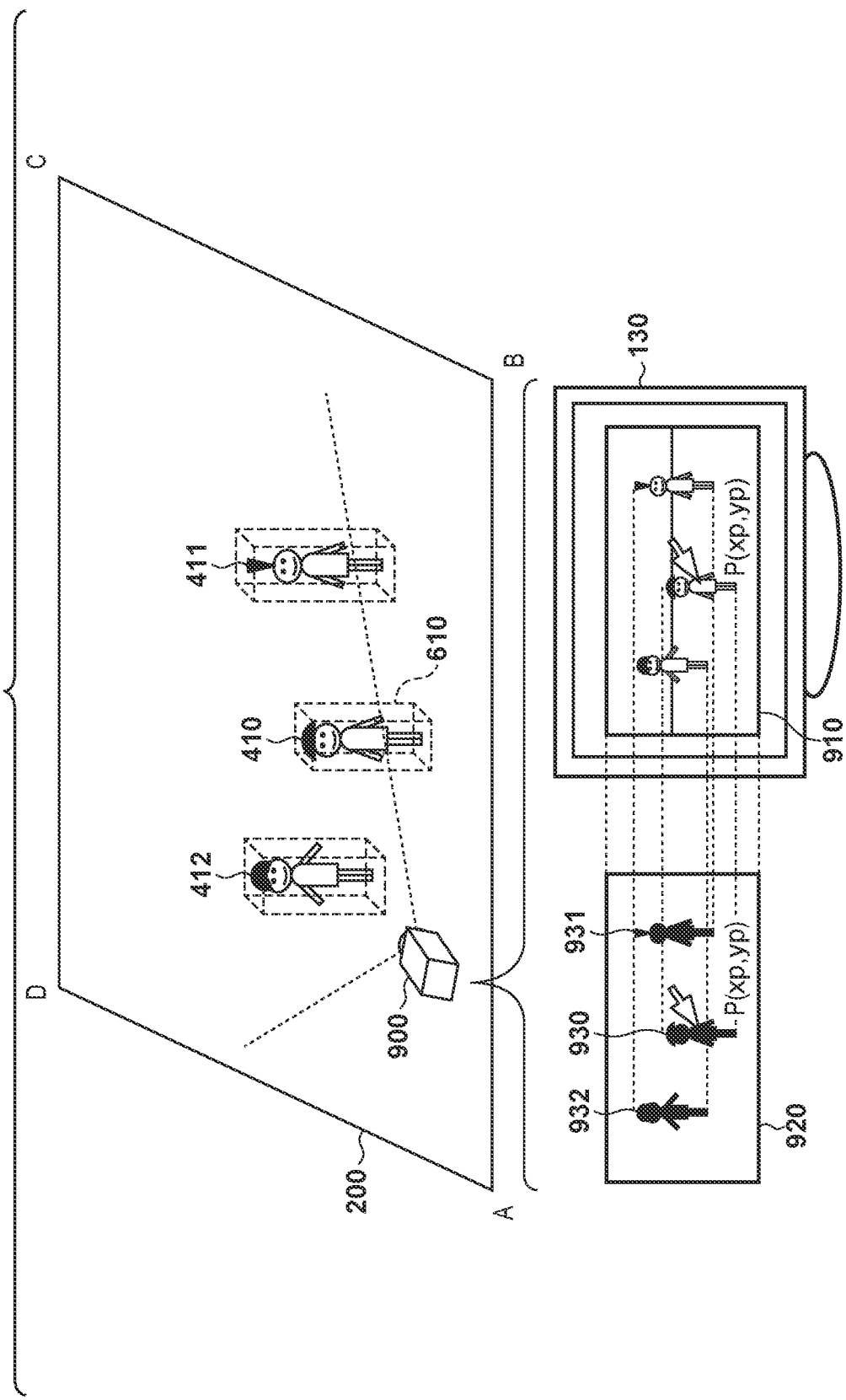
FIG. 9 is a diagram illustrating a method of specifying a bounding box corresponding to a designated object.

Here, a method of specifying a gaze object and a method of specifying a bounding box corresponding to the gaze object is described with reference to FIG. 9. As illustrated in FIG. 9, assume that an image capturing apparatus 900 is installed for object confirmation, and a captured image 910 of the image capturing apparatus 900 is distributed to a user terminal 130 via a cable (not illustrated) or the like. Note that the video of the image capturing apparatus 900 may be distributed to the user terminal 130 via the video processing apparatus 120 similarly to the image capturing apparatus 110. The user can input coordinates corresponding to the gaze object while checking the captured image 910. The object specifying unit 506 projects the three dimensional shape generated by the shape generation unit 502 onto the captured image 910 to generate an object region image 920. Assume that information necessary for the projection such as coordinates of an image capturing position and field angle information of the image capturing apparatus 900 is stored in advance, for example, in the auxiliary storage apparatus 123. The coordinates in the object region image 920 correspond to the coordinates in the image captured by the image capturing apparatus 900, and information of the projected three dimensional shape is further associated. For example, in FIG. 9, an object 410, an object 411, and an object 412 in the image capturing area 200 correspond to a region 930, a region 931, and a region 932 in the object region image 920, respectively.

When an arbitrary position of the captured image 910 is designated by the user, the coordinates thereof are notified to the object specifying unit 506 through the input unit 504. The object specifying unit 506 determines in which object the notified coordinates are included with reference to the object region image 920. For example, when the coordinate P (xp, yp) is input to designate the object 410, the object specifying unit 506 determines a region of the object including the coordinate P (xp, yp) from the object region image 920. In the example of FIG. 9, since the region 930 includes the coordinate P (xp, yp), the object specifying unit 506 specifies the object 410 corresponding to the region 930. Then, the object specifying unit 506 specifies the bounding box 610 generated for the specified object 410 as the bounding box of the gaze object. Note that the method for specifying the bounding box of the object designated by the user is not limited to the above. For example, a GPS may be attached to an object to hold information in which a position of each object is associated with an identifier, and a user may designate an identifier of a desired object. As a result, the bounding box can be specified based on the GPS position of the designated object. Furthermore, in the present embodiment, the video by one image capturing apparatus 900 is used as the video for designating the object, but a plurality of image capturing apparatuses may share and capture the image capturing area to obtain the video for the user to designate the object. In addition, although the video captured by the physical image capturing apparatus 900 is used as the video for designating the gaze object, for example, a virtual viewpoint video from a virtual viewpoint as if overlooking the image capturing area 200 may be used.

The image capturing apparatus selection unit 507 selects the image capturing apparatus used to capture an image of the bounding box specified by the object specifying unit 506 by referring to the list to be described later with reference to FIG. 11 generated by the image capturing range determination unit 505. In this way, the image capturing apparatus selected by the image capturing apparatus selection unit 507 from the plurality of image capturing apparatuses 110 is an image capturing apparatus that captures the image of the gaze object. The video selection unit 508 selects the video of the image capturing apparatus selected by the image capturing apparatus selection unit 507 from the video received from the video receiving unit 500, and sends the video to the video distribution unit 509. The video distribution unit 509 converts the virtual viewpoint video generated by the virtual viewpoint video generation unit 503 and the video transmitted from the video selection unit 508 into a predetermined display format and format, and outputs the display format and format.

Figure 10:
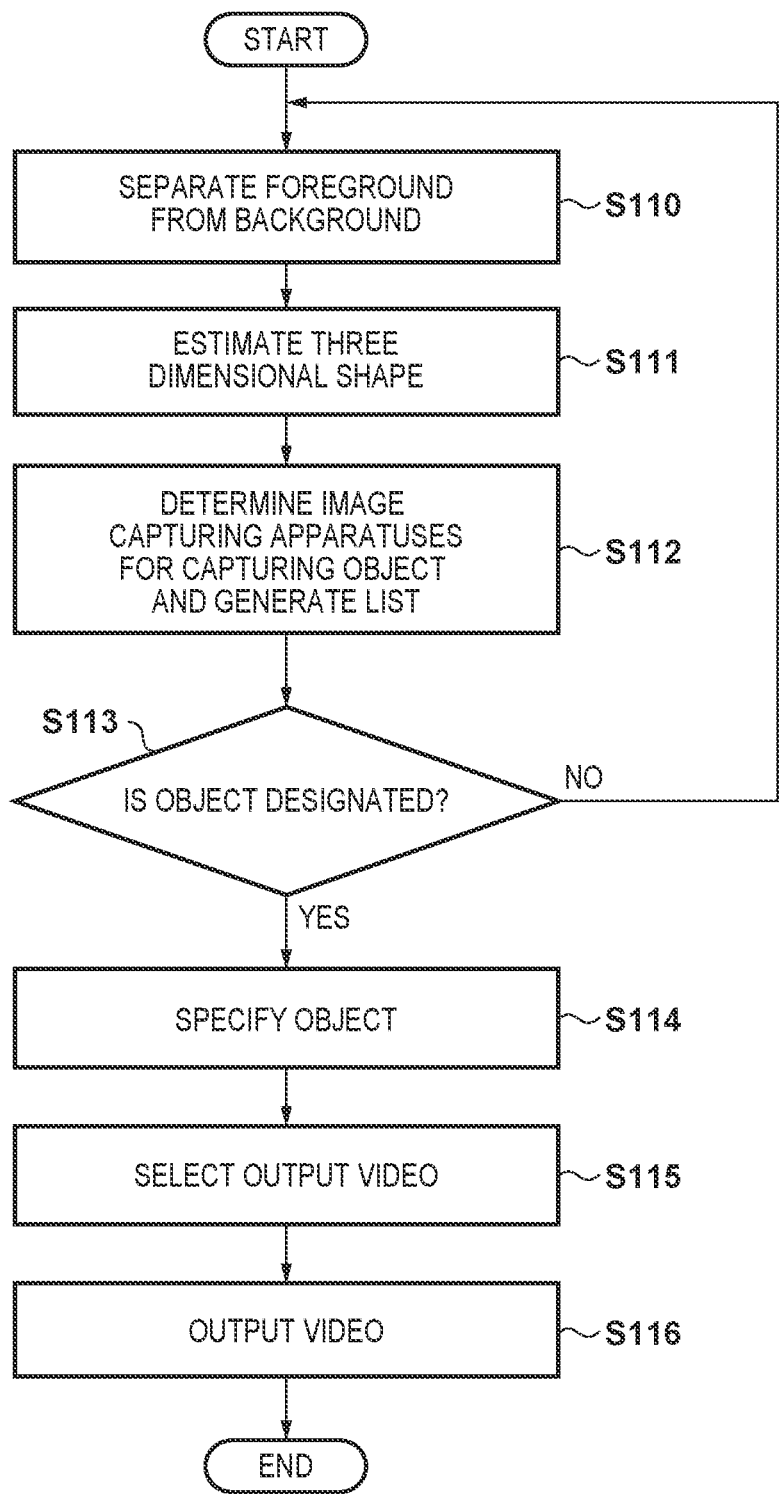
FIG. 10 is a flowchart illustrating a process of the video processing apparatus according to the first embodiment.

Next, an operation of the video processing apparatus 120 according to the first embodiment is described. FIG. 10 is a flowchart illustrating an operation of the video processing apparatus 120 according to the first embodiment. In S110, the separation unit 501 acquires the foreground video corresponding to the object existing in the image capturing area 200. Next, in S111, the shape generation unit 502 estimates the three dimensional shape of the object based on the foreground image acquired by the separation unit 501, and generates information on the three dimensional shape of the object and a bounding box corresponding thereto. In S112, the image capturing range determination unit 505 determines, for each of the bounding boxes generated in S111, an image capturing apparatus capturing the bounding box from the plurality of image capturing apparatuses 110. The image capturing range determination unit 505 uses the determination result to generate a list in which the bounding box and the image capturing apparatus capturing the bounding box are associated with each other at each time. FIG. 11 illustrates an example of a list (list 1100) generated by the image capturing range determination unit 505. In the list 1100, the correspondence between the bounding box and the number of the image capturing apparatus capturing the bounding box is listed at each time. Note that the data format of the list 1100 is not limited to the illustrated format. The list 1100 may include at least a bounding box in time series and information for specifying an image capturing apparatus capturing the bounding box.

In the S113, the object specifying unit 506 determines whether or not the gaze object is designated through the input unit 504. When the gaze object is not designated (NO in S113), the process returns to S110. When determined that the gaze object is designated (YES in S113), the process proceeds to S114. In S114, the object specifying unit 506 specifies a bounding box corresponding to the designated gaze object. Then, the image capturing apparatus selection unit 507 selects the image capturing apparatus capturing the bounding box specified by the object specifying unit 506 with reference to the list 1100 output in S112. In S115, the video selection unit 508 selects the video obtained from the image capturing apparatus selected by the image capturing apparatus selection unit 507. Note that, in a case where the video selection unit 508 selects a plurality of videos, the videos may be selected in priority order according to the user setting.

Figure 12:
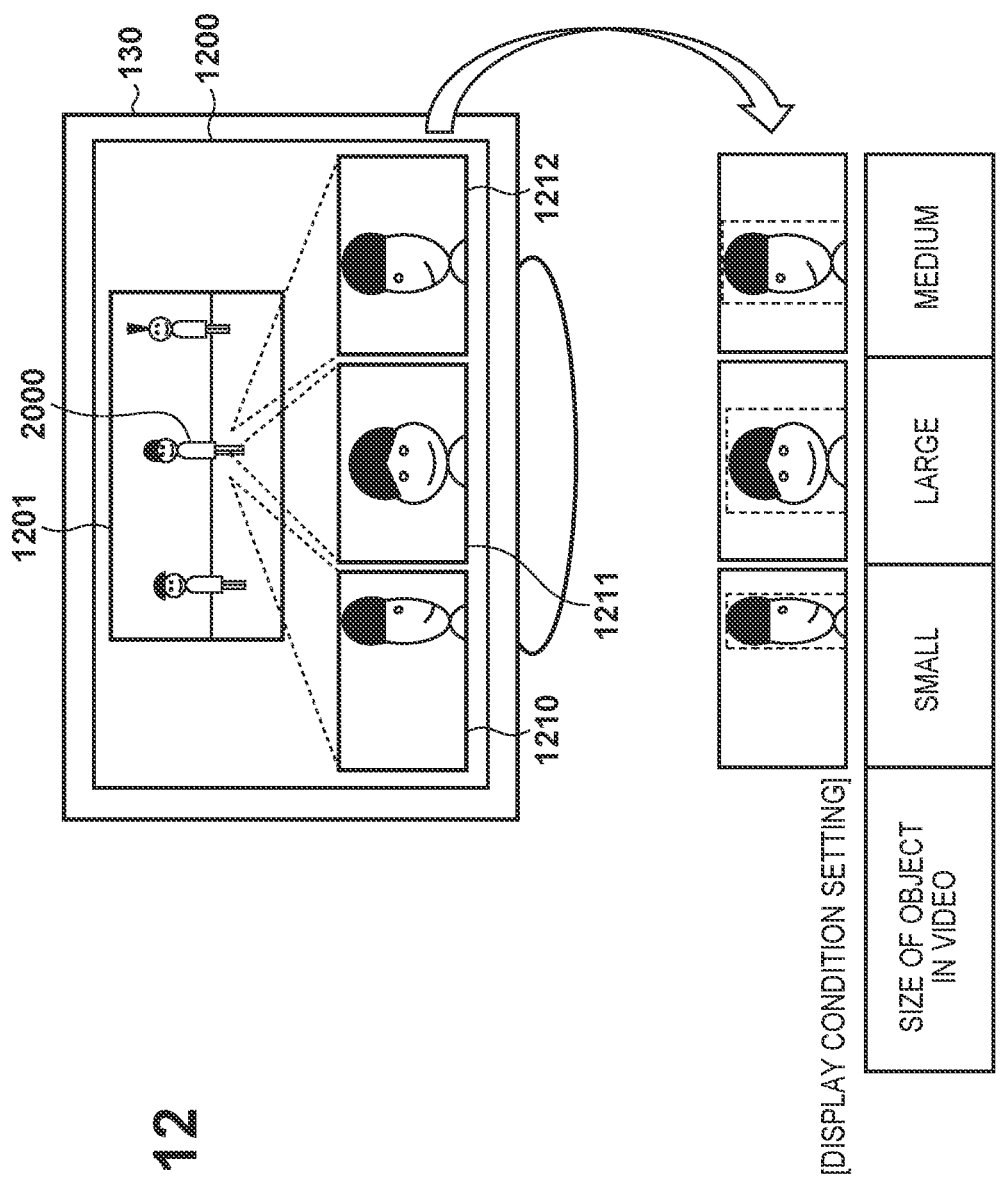
FIG. 12 is a diagram illustrating a display example according to the first embodiment.

In S116, the video distribution unit 509 outputs the display information including the video obtained by converting the video selected by the video selection unit 508 into the appropriate output format to the user terminal 130, and terminates the present process. The display information provides a video to be presented to the user when the video to be distributed is switched (the image capturing apparatus is to be switched) in the user terminal 130. FIG. 12 illustrates an example of the video displayed by the user terminal 130 according to the display information output in S116. FIG. 12 shows an image displayed by the display device of the user terminal 130 that has received the output display information. Here, the object 410 is designated as a gaze object, and a video from an image capturing apparatus (an image capturing apparatus selected by the image capturing apparatus selection unit 507) capturing the object 410 is displayed. In the display screen 1200, a video 1201 for object confirmation (a video obtained from the image capturing apparatus 900), and a video 1210, a video 1211, and a video 1212 of the image capturing apparatus capturing the object 410 selected by the video selection unit 508 are displayed. Display conditions such as the display position and size of the videos 1210 to 1212 can be set in advance by the user. For example, in a case where priority is given to the size of the object in the video, the video is given higher order as the object appears larger, and the video is arranged and displayed according to the given order. FIG. 12 illustrates a state in which the size of the object 410 in the video is prioritized, and the video is arranged from the center in descending order of the size of the object 411. Specifically, the video distribution unit 509 generates and distributes the display information (video) such that the captured videos are arranged in descending order of the proportion of the area of the bounding box corresponding to the designated object with respect to the entire video of the image capturing apparatus. As described above, in a case where the display condition is set in advance by a user operation or the like, the video distribution unit 509 sets the display order, the size, and the like according to the set display condition for the captured video selected by the video selection unit 508, and generates and outputs the display information (video). Note that a predetermined number of videos may be displayed in descending order of the order. Furthermore, the predetermined number may be set by the user.

Of course, the display condition is not limited to the above, and various conditions can be applied. For example, in a case where the object is a physical object such as a person whose front surface exists from the video, a higher order may be set to the video in which the object is facing the front. The closer the position of the object in the videos is to the center, the higher the order in which the image is set. In addition, in a case where determination is made as a similar video, an image capturing state may be determined from brightness, contrast, and the like, and a video with a good image capturing state may be displayed as a representative without displaying all of the videos selected by the video selection unit 508. For example, the size and position of the object in the video are quantified and calculated as a numerical value, and the video in which a difference between the calculated numerical values is smaller than or equal to a predetermined value is regarded as a similar video and classified into a group of similar videos. Then, from each of the groups of videos, a video determined to be in a good imaging state on the basis of brightness, contrast, or the like is selected and displayed as a representative. Although the example of presenting the image capturing apparatus selected by the image capturing apparatus selection unit 507 by displaying the video has been described above, the present invention is not limited thereto. For example, the image capturing apparatus selected by the image capturing apparatus selection unit 507 may be presented by presenting the identification information. In this case, the order set for the video is also the order of the corresponding image capturing apparatus. Therefore, the arrangement of the identification information of the image capturing apparatus to be displayed may be determined according to the above order. Note that these exemplified display conditions may be set according to usage conditions or the like of the video processing system 100.

When the user selects a desired video from candidate videos (video 1210, video 1211, video 1212), the video processing apparatus 120 is instructed to set a video from the image capturing apparatus that is capturing the selected video as a distribution target. This instruction is notified to the video selection unit 508 through the input unit 504, and the video selection unit 508 selects a video from the instructed image capturing apparatus. The video distribution unit 509 stops distribution of the video distributed so far, and starts distribution of the video selected by the video selection unit 508. In this way, the video to be distributed is switched.

As described above, according to the first embodiment, the video of the image capturing apparatus capturing the specific object is displayed as the candidate video. The user can select an image capturing apparatus capturing a specific object by selecting a desired candidate video from the displayed candidate videos. Therefore, the switching operation of the distribution video becomes easy. Note that although the video (candidate video) of the selected image capturing apparatus is displayed in the above description, information (e.g., an apparatus number or the like) for identifying the selected image capturing apparatus may be displayed. The user can select a desired image capturing apparatus from the displayed identification information. In this case, although selection cannot be made while viewing the video, the video apparatus of the switching destination can be narrowed down, so that operability is improved.

Second Embodiment

A method for specifying and displaying a video of an image capturing apparatus including a specific object or a virtual viewpoint video according to a second embodiment is described with reference to FIGS. 13 to 17. In the first embodiment, the captured video in which the designated object appears is specified from the captured video captured by the image capturing apparatus that is the real camera. In the second embodiment, the captured video in which the designated object appears is specified from the captured video captured by the image capturing apparatus and the virtual video from the virtual viewpoint. That is, in the second embodiment, a configuration in which a virtual viewpoint video different from the distributed and displayed virtual viewpoint video is used as a candidate for the switching video in addition to the video of the image capturing apparatus is described.

Figure 13:
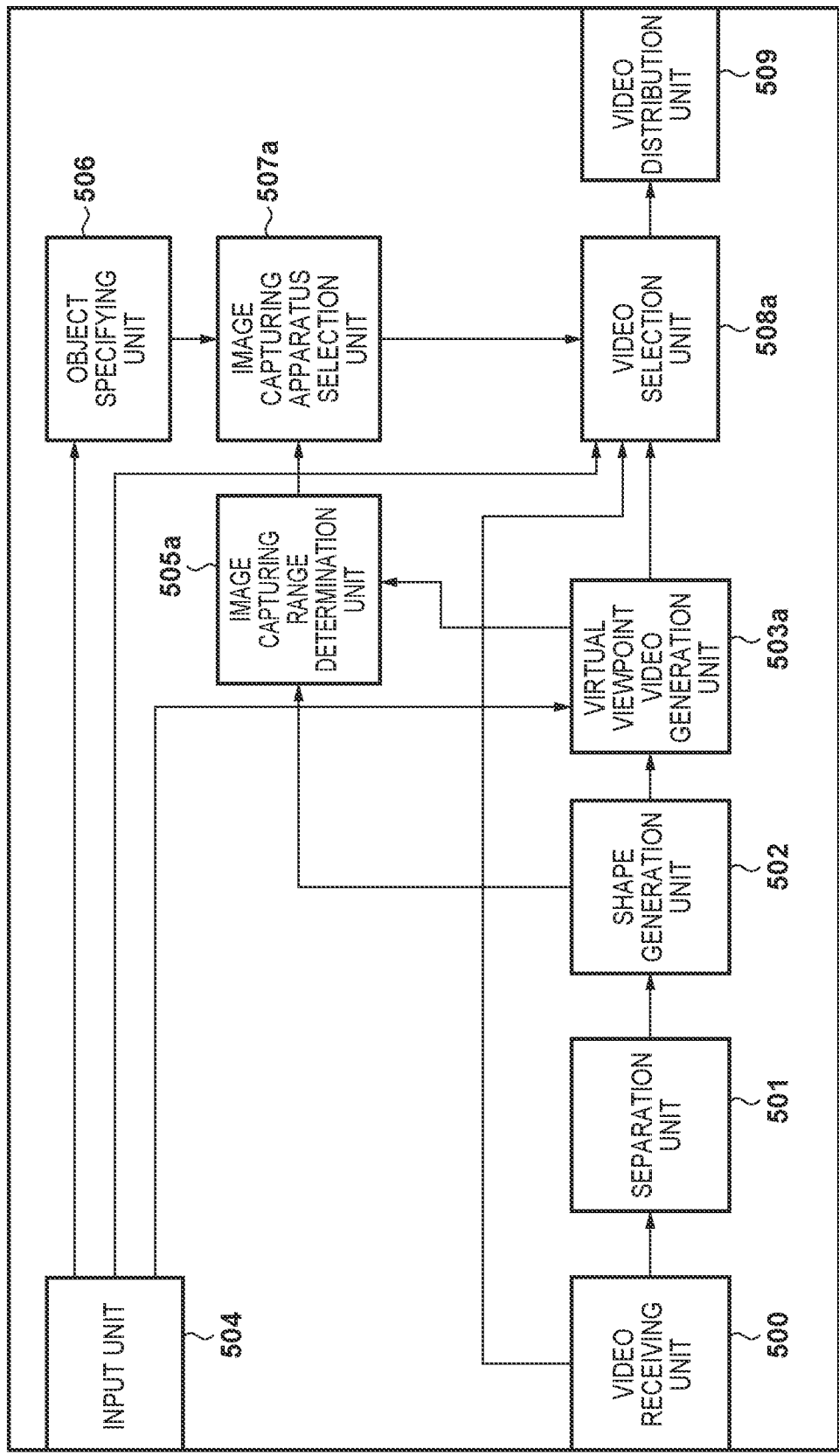
FIG. 13 is a block diagram illustrating a functional configuration example of a video processing apparatus according to a second embodiment.

A functional configuration of the video processing apparatus 120 according to the second embodiment is described. FIG. 13 is a block diagram illustrating a functional configuration example of the video processing apparatus 120 according to the second embodiment. Similarly to the first embodiment (FIG. 3), each functional block can be realized by causing the CPU 121 to load and execute a computer program stored in the auxiliary storage apparatus 123 in the main storage apparatus 122. In the functional block of the video processing apparatus 120 of the second embodiment, a virtual viewpoint video generation unit 503a is connected to the image capturing range determination unit 505a and the video selection unit 508a. The same functional blocks as those of the video processing apparatus 120 of the first embodiment (FIG. 5) are denoted by the same reference numerals. Hereinafter, the functions of the virtual viewpoint video generation unit 503a, the image capturing range determination unit 505a, and the video selection unit 508a is mainly described.

The virtual viewpoint video generation unit 503a receives designation of positions and directions of one or a plurality of virtual viewpoints, and generates one or a plurality of virtual viewpoint videos in accordance with the received information of the virtual viewpoints. The video selection unit 508a selects a video to be distributed from the videos of the plurality of image capturing apparatuses received by the video receiving unit 500 and the virtual viewpoint video virtually generated by the virtual viewpoint video generation unit 503a. Furthermore, the virtual viewpoint video generation unit 503a provides information on the position and the image capturing field angle of the virtual viewpoint to the image capturing range determination unit 505a.

Figure 14:
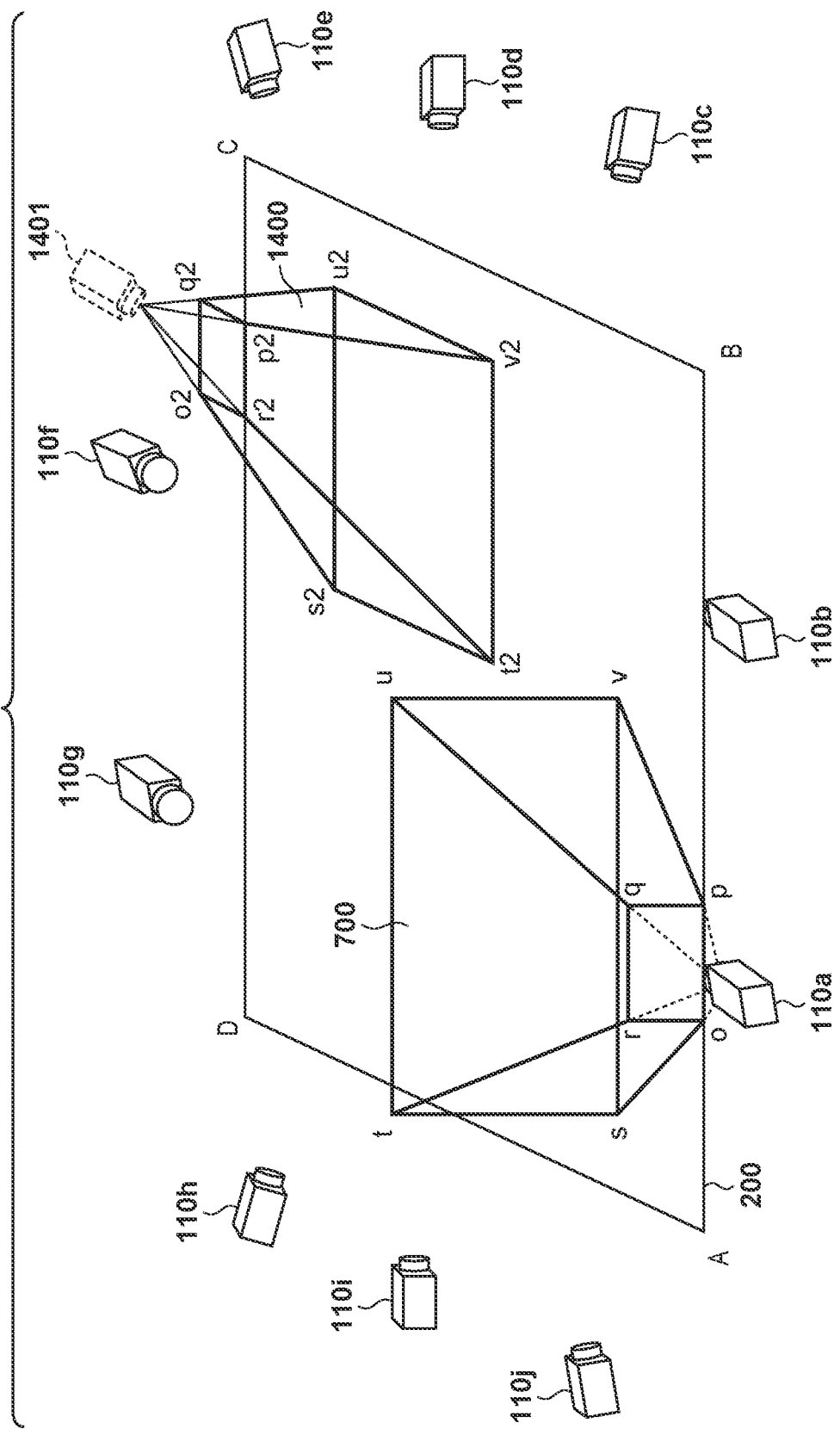
FIG. 14 is a schematic diagram illustrating an image capturing apparatus and an image capturing range of a virtual viewpoint.

Similarly to the first embodiment, the image capturing range determination unit 505a calculates in advance information on the image capturing range of each of the plurality of image capturing apparatuses 110, and stores the information in the memory. Furthermore, the image capturing range determination unit 505a calculates the image capturing range of the virtual viewpoint from the information on the position and the image capturing field angle of the virtual viewpoint from the virtual viewpoint video generation unit 503a, and stores the same in the memory in addition to the image capturing range of each of the plurality of image capturing apparatuses 110. FIG. 14 illustrates an example of the image capturing range calculated by the image capturing range determination unit 505a of the second embodiment. In addition to the information on the image capturing range of the image capturing apparatus 110 calculated in the first embodiment, the image capturing range of the virtual viewpoint 1401 (the range of the virtual viewpoint video generated by the virtual viewpoint 1401) is calculated. Here, the image capturing range 1400 defined by a stereoscopic figure (quadrangular pyramid) having point o2, point p2, point q2, point r2, point s2, point t2, point u2, and point v2 as vertices is calculated as the image capturing range of the virtual viewpoint 1401. Furthermore, when there are a plurality of virtual viewpoints, the image capturing range determination unit 505a calculates the image capturing range for all the virtual viewpoints, and stores the same in the memory. Moreover, the image capturing range determination unit 505a determines whether or not the bounding box generated by the shape generation unit 502 is captured for all the image capturing apparatuses and the virtual viewpoints. The image capturing range determination unit 505a generates a list 1600 as illustrated in FIG. 16 in which a bounding box, an image capturing apparatus and a virtual viewpoint that capture the bounding box are associated with each other.

The image capturing apparatus selection unit 507a, the video selection unit 508 a, and the video distribution unit 509 perform similar processes as those of the first embodiment, but similarly treat the video of the virtual viewpoint prepared in advance and the video of the image capturing apparatus.

Figure 15:
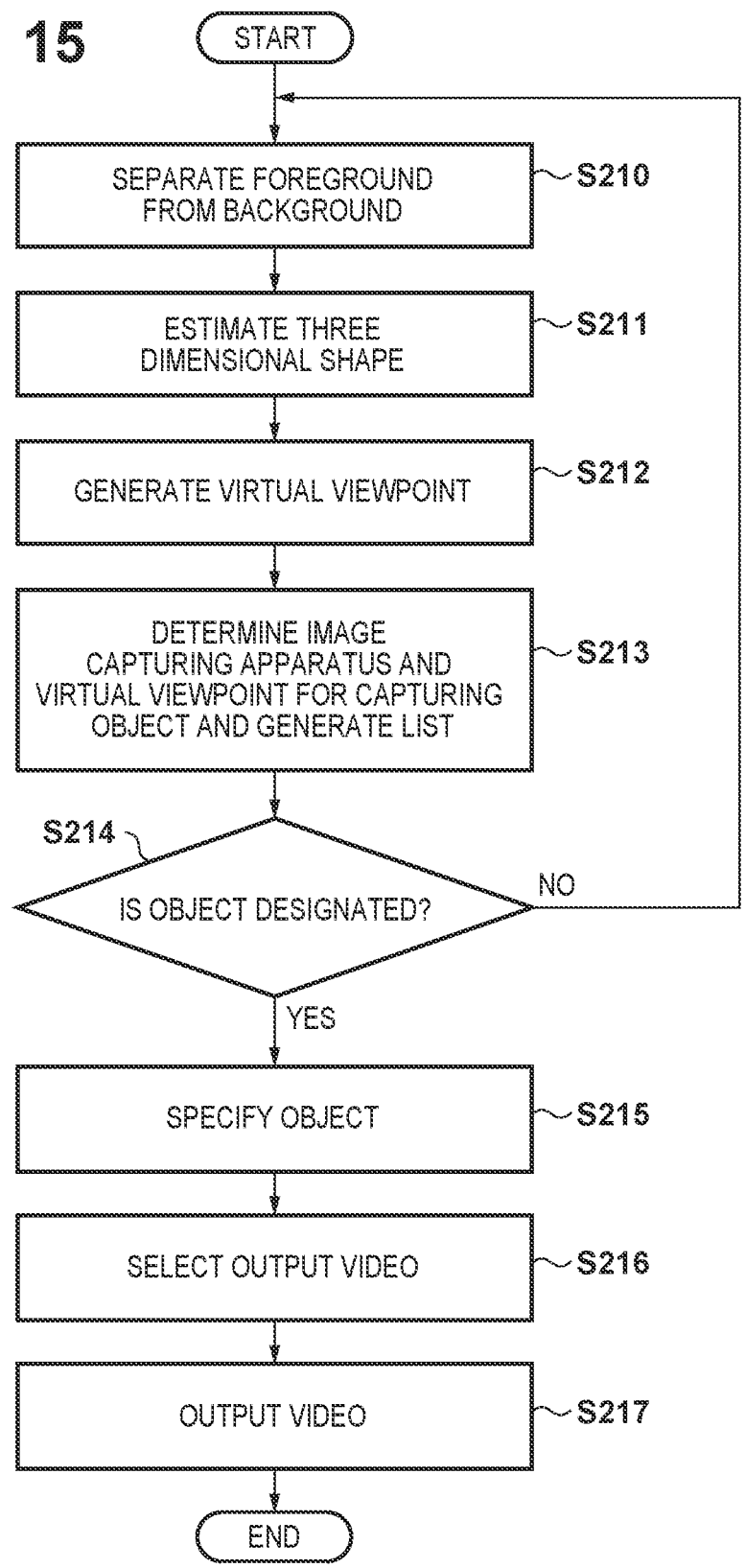
FIG. 15 is a flowchart illustrating a process of the video processing apparatus according to the second embodiment.

Next, an operation of the video processing apparatus 120 according to the second embodiment is described. FIG. 15 is a flowchart illustrating an operation of the video processing apparatus 120 according to the second embodiment.

In S210, the separation unit 501 generates the foreground video of the object existing in the image capturing area 200. Next, in S211, the shape generation unit 502 estimates the three dimensional shape on the basis of the foreground image generated by the separation unit 501, and generates three dimensional shape information and a bounding box corresponding thereto. In S212, the virtual viewpoint video generation unit 503a generates the virtual viewpoint video from the virtual viewpoint input to the input unit 504. The virtual viewpoint video generation unit 503a outputs virtual viewpoint information including the position and the image capturing field angle of the virtual viewpoint to the image capturing range determination unit 505a.

In S213, the image capturing range determination unit 505a determines the image capturing apparatus and the virtual viewpoint capturing the bounding box generated in S211. When there are a plurality of bounding boxes existing in the image capturing area 200, the image capturing range determination unit 505a determines the image capturing apparatus and the virtual viewpoint capturing the bounding boxes for all the bounding boxes. The image capturing range determination unit 505a generates a list of the bounding box at each time, the image capturing apparatus and the virtual viewpoint capturing the bounding box based on the determination results. FIG. 16 illustrates an example of this list (list 1600). The list 1600 is a list of the bounding box at each time, and the number of the image capturing apparatus and the virtual viewpoint capturing the bounding box. The data format of the list is not limited to that shown in FIG. 16. The list 1600 merely needs to include at least a bounding box in a certain time series and information specifying an image capturing apparatus and a virtual viewpoint image-capturing the bounding box, and any data format thereof may be adopted.

Subsequently, in S214, the object specifying unit 506 determines whether or not a gaze object is designated through the input unit 504. When determined that the gaze object is not designated (NO in S214), the process returns to S211. On the other hand, when determined that the gaze object is designated (EYS in S214), the process proceeds to S215. In S215, the object specifying unit 506 specifies a bounding box corresponding to the specified gaze object. In S216, the image capturing apparatus selection unit 507$a$ refers to the list 1600 generated in S213, and selects the image capturing apparatus and the virtual viewpoint capturing the bounding box specified in S215. Then, the video selection unit 508$a$ selects the video of the image capturing apparatus and the virtual viewpoint selected by the image capturing apparatus selection unit 507$a$ as the video to be output. Processing in a case where the display condition is set by the user is similar to that in the first embodiment.

Figure 17:
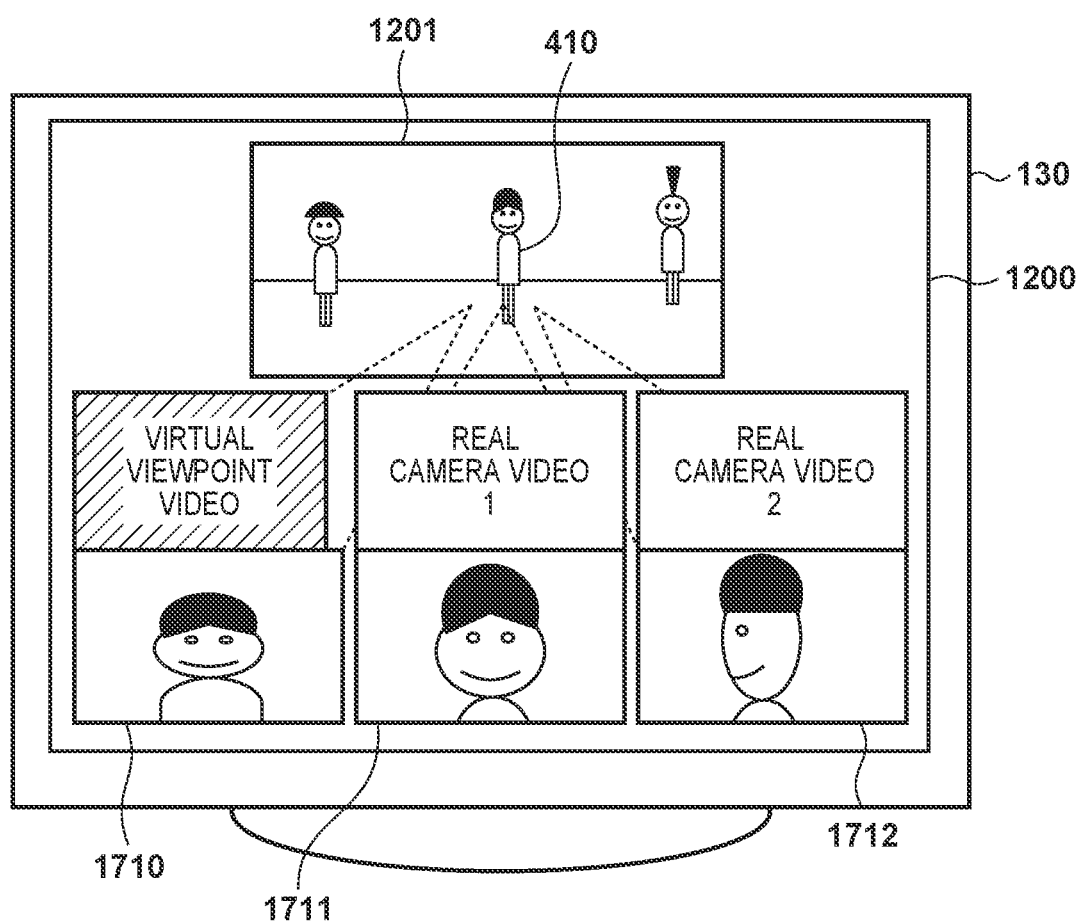
FIG. 17 is a diagram illustrating a display example according to the second embodiment.

In S217, video distribution unit 509 converts the selected video into an appropriate output format to generate display information (a video for presentation), and outputs the display information to the user terminal 130. FIG. 17 illustrates an example of an output video by the user terminal 130 that has received the display information according to the second embodiment. FIG. 17 is an example of an image displayed by the display device of the user terminal 130 that has received the output display information (video). Here, the object 410 is designated as a gaze object, and a video of the image capturing apparatus and the virtual viewpoint capturing the designated gaze object is displayed. Specifically, a video 1201 (a video obtained from the image capturing apparatus 900), a video 1710 of the virtual viewpoint selected by the video selection unit 508, and a video 1711 and a video 1712 of the image capturing apparatus are displayed in the display screen 1200. The video 1710, the video 1711, and the video 1712 are switching candidate videos showing the object 410 which is the gaze object. Note that, similarly to the first embodiment, the display position, size, and the like of the videos 1710 to 1711 comply with the display conditions set in advance by the user. Furthermore, as illustrated in FIG. 17, the display information (video) may be configured such that the user can distinguish whether the video is from the virtual viewpoint or the image capturing apparatus.

As described above, according to the second embodiment, the video of the image capturing apparatus including the specific object or the virtual viewpoint video from the virtual viewpoint is specified and displayed as the switching candidate. Since the user can select a desired video from the videos displayed as the candidates, operability at the time of switching the videos is improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-025603, filed Feb. 22, 2022 which is hereby incorporated by reference herein in its entirety.

What is claimed is:
1. A video processing apparatus comprising:
one or more memories storing instructions; and
one or more processors for executing the instructions to:
distribute, to a user terminal, a virtual viewpoint video generated by using videos captured by a plurality of second real image capturing apparatuses;
receive, from the user terminal, information of designation of an object on a video for designation of the object by a user, wherein the video for designation of the object is not the virtual viewpoint video, the video for designation of the object is displayed on the user terminal, and the video for designation of the object is captured by a first real image capturing apparatus that is directly connected to the user terminal;
specify, from the plurality of second real image capturing apparatuses that are used for generation of the virtual viewpoint video and are connected to the video processing apparatus, a plurality of image capturing apparatuses that captured a video including the designated object in an image capturing range based on three dimensional shape information corresponding to the designated object, the designated object existing in an image capturing area captured by the plurality of second real image capturing apparatuses;
output, to the user terminal, display information including presentation of a plurality of videos, each of which is captured by the specified plurality of image capturing apparatuses;
receive selection of one of the plurality of videos captured by a respective one of the specified plurality of image capturing apparatuses; and
change a video to be distributed to the user terminal from the virtual viewpoint video to the one of the plurality of videos captured by the respective one of the specified plurality of image capturing apparatuses.

2. The video processing apparatus according to claim 1, wherein the display information including the presentation of the video for designation of the object in addition to the video captured by the specified image capturing apparatus is output.

3. The video processing apparatus according to claim 1, wherein each of the specified plurality of image capturing apparatuses is an image capturing apparatus whose image capturing range includes at least a part of a bounding box surrounding an object represented by the three dimensional shape information.

4. The video processing apparatus according to claim 1, wherein an image capturing range of each of the plurality of second real image capturing apparatuses is obtained based on a position and an orientation of each of the plurality of second real image capturing apparatuses.

5. The video processing apparatus according to claim 1, wherein the presentation further includes presentation of information for identifying the specified plurality of image capturing apparatuses.

6. The video processing apparatus according to claim 1, wherein the one or more processors further execute the instructions to
set an order of the specified plurality of image capturing apparatuses or a video of the respective one of the specified plurality of image capturing apparatuses based on the video of the respective one of the specified plurality of image capturing apparatuses; and
in the display information, the presentation is arranged based on the set order.

7. The video processing apparatus according to claim 6, wherein the order is set for the respective one of the specified plurality of image capturing apparatuses based on any one of the conditions of setting a higher order as the size of the object appearing in the video becomes larger; setting a higher order to a video in which the object appearing in the video is facing front; and setting a higher order as the position of the object appearing in the video becomes closer to the center of the video.

8. The video processing apparatus according to claim 1, wherein the one or more processors further execute the instructions to
classify the specified plurality of image capturing apparatuses into groups of image capturing apparatuses that have captured similar videos by quantifying size or position of an object in the image, and determine one image capturing apparatus for each group; and
the display information includes presentation of the determined one image capturing apparatus.

9. The video processing apparatus according to claim 1, wherein the one or more processors further execute the instructions to
specify, from preset virtual viewpoints, a virtual viewpoint from which a virtual viewpoint video including the object designated by the user is generated; and
the display information includes presentation of the specified image capturing apparatus and presentation of the specified virtual viewpoint.

10. The video processing apparatus according to claim 9, wherein the presentation of the image capturing apparatus and the virtual viewpoint according to the display information enables a user to distinguish whether the presentation is the image capturing apparatus or the virtual viewpoint.

11. The video processing apparatus according to claim 9, wherein the one or more processors further execute the instructions to
switch a video to be distributed to a video of an image capturing apparatus or a virtual viewpoint selected by a user from the image capturing apparatuses and the virtual viewpoints presented according to the display information.

12. A control method of a video processing apparatus, the method comprising:
distributing, to a user terminal, a virtual viewpoint video generated by using videos captured by a plurality of second real image capturing apparatuses;
receiving, from the user terminal, information of designation of an object on a video for designation of the object by a user, wherein the video for designation of the object is not the virtual viewpoint video, the video for designation of the object is displayed on the user terminal, and the video for designation of the object is captured by a first real image capturing apparatus that is directly connected to the user terminal;
specifying, from the plurality of second real image capturing apparatuses that are used for generation of the virtual viewpoint video and are connected to the video processing apparatus, a plurality of image capturing apparatuses that captured a video including the designated object in an image capturing range based on three dimensional shape information corresponding to the designated object, the designated object existing in an image capturing area captured by the plurality of second real image capturing apparatuses;
outputting, to the user terminal, display information including presentation of a plurality of videos, each of which is captured by the specified plurality of image capturing apparatuses;
receiving selection of one of the plurality of videos captured by a respective one of the specified plurality of image capturing apparatuses; and
changing a video to be distributed to the user terminal from the virtual viewpoint video to the one of the plurality of videos captured by the respective one of the specified plurality of image capturing apparatuses.

13. A non-transitory computer-readable storage medium storing a program for causing a computer to execute a method for controlling a video processing apparatus, the control method comprising:
distributing, to a user terminal, a virtual viewpoint video generated by using videos captured by a plurality of second real image capturing apparatuses;
receiving, from the user terminal, information of designation of an object on a video for designation of the object by a user, wherein the video for designation of the object is not the virtual viewpoint video, the video for designation of the object is displayed on the user terminal, and the video for designation of the object is captured by a first real image capturing apparatus that is directly connected to the user terminal;
specifying, from the plurality of second real image capturing apparatuses that are used for generation of the virtual viewpoint video and are connected to the video processing apparatus, a plurality of image capturing apparatuses that captured a video including the designated object in an image capturing range based on three dimensional shape information corresponding to the designated object, the designated object existing in an image capturing area captured by the plurality of second real image capturing apparatuses;

outputting, to the user terminal, display information including presentation of a plurality of videos, each of which is captured by the specified plurality of image capturing apparatuses;
receiving selection of one of the plurality of videos captured by a respective one of the specified plurality of image capturing apparatuses; and
changing a video to be distributed to the user terminal from the virtual viewpoint video to the one of the plurality of videos captured by the respective one of the specified plurality of image capturing apparatuses.

\* \* \* \* \*